R. W. SCOTT.
ADJUSTMENT DEVICE FOR MACHINE ELEMENTS.
APPLICATION FILED JULY 25, 1913.
1,138,799.
Patented May 11, 1915.
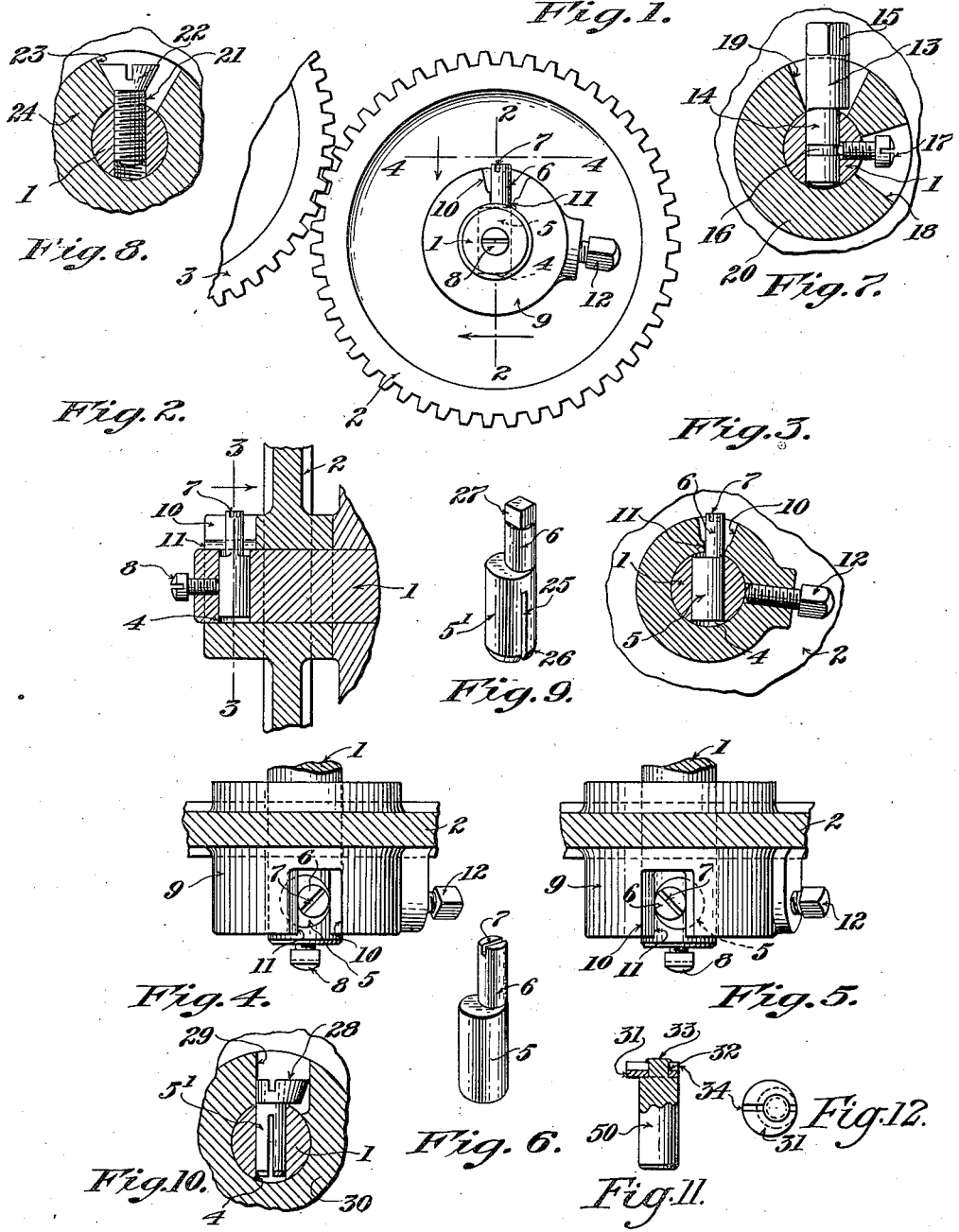

UNITED STATES PATENT OFFICE.

ROBERT W. SCOTT, OF BOSTON, MASSACHUSETTS.

ADJUSTMENT DEVICE FOR MACHINE ELEMENTS.

1,138,799.  Specification of Letters Patent.  Patented May 11, 1915.

Application filed July 25, 1913. Serial No. 781,053.

*To all whom it may concern:*

Be it known that I, ROBERT W. SCOTT, a citizen of the United States, and a resident of Boston, in the county of Suffolk and State of Massachusetts, have invented a certain new and useful Improvement in Adjustment Devices for Machine Elements, of which the following is a specification.

My invention relates to a device for the accurate adjustment of the angular relation of a machine element, such as a member of a gear train, to a shaft upon which it is mounted.

An object of my invention is to secure the accurate or fine rotative adjustment of a rotary element, such as a member of a gear train, or a cam or other element of the pattern devices of a textile machine, or an element of an associating device for a rotary printing machine, or for use in any other situation requiring accurate adjustment between the primary drive member and a remote driven member.

In the accompanying drawings, Figure 1 is a side elevation of a part of a gear train showing the end of the power or drive shaft and the adjustable gear of said train; Fig. 2 is a section on the line 2—2, Fig. 1; Fig. 3 is a section on the line 3—3 of Fig. 2; Fig. 4 is a section on the line 4—4 of Fig. 1; Fig. 5 is a view similar to Fig. 4 showing another position of the adjustable element; Fig. 6 is a detail in perspective; Fig. 7 is a section transverse to the driving shaft showing a modified form; Fig. 8 is a figure similar to Fig. 7 showing another modification; Fig. 9 is a detail in perspective showing one form of the transverse, adjustable member; Fig. 10 is a view similar to Fig. 7 illustrating another modification; Figs. 11 and 12 show respectively a detail section and plan of a further modification.

In machines of the classes above indicated it sometimes becomes necessary to rotatably adjust the position of elements in relation to each other with accuracy after the machine has been assembled. Where the element adjusted is for instance driven by a gear train such as that comprising the gear 2 and 3, of which the gear 2 is the primary or driving member and the gear 3 a secondary or driven member, coarse adjustments may be made by sliding one of the gears upon its shaft or stud out of mesh with the other gear or gears and reassembling them in engagement. But adjustments of the angular position of the whole train with respect to the primary driving element, for instance the shaft 1, must now be relied upon to complete the accurate setting of the ultimate driven part. Fine adjustments through an angle less than one pitch distance of an intermeshing gear are difficult to make by usual machinists' expedients, for instance as by unlocking the gear 2 from its engagement with the shaft 1, which may be assumed to rotate with respect to the remainder of the machine at a constant relation to said machine, and rotating said gear by hand. The same considerations apply when the members to be adjusted are not gears, for instance when a cam or a crankdisk or other element is the member available for adjustment. My new device provides a simple and cheap construction for this purpose comprising in one form a transverse bore 4 formed in the end of the driving shaft 1, in which bore is seated for rotation a short transverse shaft or a pin 5 having a projecting integral eccentric portion 6 slotted at 7 for a screw-driver. The adjusted rotary position with respect to the shaft 1 of the pin 5 may be fixed by the set screw 8 in a threaded bore axial of the shaft 1.

The part 2 is formed about a hub 9 bored out for the shaft 1, and having a set screw 12 to lock it upon the shaft. I may cast the hub 9 with a comparatively wide and flaring channel 10 formed longitudinally thereof, but not penetrating to the bore for the shaft 1, and I may thereafter mill or otherwise form a slot 11 in the bottom of the channel 10, the walls of the said slot occupying radial planes, and being of a distance apart to receive the eccentric portion 6 of the pin 5. The width of the slot 11 at its intersection with the bore in the hub 9 may be accurately of the diameter of the eccentric portion 6, but a slight play or looseness is of no disadvantage in most situations. The adjustment of the part 2 with respect to the driving shaft 1 and therefore to any agencies of the machine related to said driving shaft 1 may be made by loosening the screws 8 and 12 and rotating the pin 5 by means of the slot 7 and a screw driver or wrench applied therein, the desired adjustment being retained by locking the set screw 8, and the driving strain on the eccentric portion 6 being relieved by locking the set screw 12.

My device may be embodied in slightly different forms without altering the principle of its operation. I have shown, for instance, in Fig. 7 a modification suitable to a situation in which the end of the shaft 1 is not readily accessible. In this form the eccentric member is an enlarged head 13 integral with a reduced pin 14 held in a transverse bore in the shaft 1. Said head 13 may be squared as at 15 for a wrench and the pin 14 may be provided with a groove 16 for a set screw 17 in a threaded bore in shaft 1, and having a head freely movable in a flaring slot 18 in the hub 20 of the part to be adjusted. The eccentric portion 13 takes loosely into a slot 19 in the said hub. The adjustments may be effected by loosening the screw 17 and turning the pin and the hub member 20 with it through the desired small angle, then tightening the screw.

As shown in Fig. 8, I may internally thread the bore in the shaft 1 for a screw 21 having a flaring head 22 reacting with a cam slope 23 formed in the hub 24 of the gear or other element to be adjusted. The head of the screw 22 will then move the member 24 (which may be a cam or gear, for instance) about the axis of the shaft 1 by the cam action of the head 22 when the screw is rotated. It will be understood that in practice the member 24 may be locked in place by other means such as a set screw after the adjustment is effected.

As shown in Fig. 9, I may make the form of my device above described as a round pin 5' slotted at 25, beveled at 26, and driven to a tight fit in the bore 4 in a shaft 1, the eccentric portion 6 remaining the same as that illustrated in Fig. 6. I may, however, employ a square or other shaped end 27 instead of the screw driver slot 7 shown in said Fig. 6. The same ends may be reached by the device shown in Fig. 10 in which a pin 5' driven home in the bore 4 of the shaft 1 is provided with a truncated cone head 28 integrally formed therewith, said cone having its apex in line with one of the surfaces of the pin 5', in order that it may coöperate with the walls of a parallel-wall slot 29 milled in the hub of the element to be adjusted, shown at 30. The eccentricity and the position of the axis of the cone 28 are such as to permit the said cone head to contact with one wall of the slot 29 in all positions, with the wall of the slot lying nearly parallel with an element of the surface of the cone at any angular position of the part 30 with respect to the axis of the shaft 1. As before the element 30 may be locked in place by any well known expedient after the adjustment is reached, although for many uses no locking means will be required, the adjusting device furnishing a sufficient key or dog to transmit the required power.

In Figs. 11 and 12 I have illustrated a modification in which the eccentric member is a washer 31 having an eccentric bore 32, said washer being held for rotation on a concentric portion 33 of a pin 50, which may be driven or firmly fixed in a bore 4 in the shaft 1. The washer 31 may enter, with sufficient play or looseness to enable it to be turned, in a slot such as the slot 29, in an element to be adjusted such as the part 30. The eccentric member 21 may be turned by means of the slot 34 and a screw driver, which may be a bifurcated screw driver.

My device is available in any situation in which there is a driving and driven member and an intervening rotary element which it is desirable to adjust with respect to the driving member. I may, as mere instances, thus vary the relation of a main pattern or cam shaft, a driven pattern cam drum, and an auxiliary pattern in a textile machine such as a loom or a knitting machine, or the relation of the printing rolls in a multi-color printing press, or the relation between the parts of many other machines to which my device is of obvious application.

What I claim is:—

1. A device for adjusting the angular position of a machine element comprising a drive shaft, a member mounted on said shaft normally for rotation therewith, and means held in a transverse bore in said shaft having a rotatable eccentric portion engaging said member to determine the angular position of said member on said shaft.

2. In an adjustment device for machine elements a drive shaft, a normally fixed member mounted on said shaft for rotation therewith, and means for adjusting the angular position of said normally fixed member comprising rotatable means housed in a transverse bore in said shaft having an eccentric portion engaging said normally fixed member, to determine its position on said shaft, and means for locking said normally fixed member in its adjusted position.

3. A gear train having adjustable elements comprising a driving shaft, a pin in a transverse bore in said shaft having an eccentric portion projecting from said pin, a part mounted on said shaft having a flaring slot embracing said eccentric portion, and means to lock said pin and said part with respect to said driving shaft.

4. As an article of manufacture an adjustment member for determining the position of one machine element mounted upon another comprising a split pin having an eccentric portion at one end thereof, said portion being formed for the reception of a tool for rotating the eccentric portion when the structure is in its seated position.

In testimony whereof, I have signed my name to this specification in the presence of two subscribing witnesses.

ROBERT W. SCOTT.

Witnesses:
 MARY F. GRIFFIN,
 ROY C. SOUTHWORTH.